(12) United States Patent
Duarte-Escareno et al.

(10) Patent No.: US 6,986,800 B2
(45) Date of Patent: Jan. 17, 2006

(54) METHOD AND APPARATUS FOR IMPROVED USE OF PRIMARY ENERGY SOURCES IN INTEGRATED STEEL PLANTS

(75) Inventors: Pablo-Enrique Duarte-Escareno, Monterrey (MX); Eugenio Zendejas-Martinez, Monterrey (MX); Carlos Lizcano-Zulaica, Guadalupe (MX)

(73) Assignee: Hylsa, S.A. DE C.V., San Nicolas de los Garza (MX)

( * ) Notice: Subject to any disclaimer, the term of this patent is extended or adjusted under 35 U.S.C. 154(b) by 0 days.

(21) Appl. No.: 10/846,508

(22) Filed: May 17, 2004

(65) Prior Publication Data

US 2004/0226406 A1 Nov. 18, 2004

Related U.S. Application Data

(60) Provisional application No. 60/470,437, filed on May 15, 2003.

(51) Int. Cl.
*C21B 5/06* (2006.01)

(52) U.S. Cl. ........................................... 75/458
(58) Field of Classification Search ............... 75/458
See application file for complete search history.

(56) References Cited

U.S. PATENT DOCUMENTS

| 4,248,624 A | 2/1981 | Novoa et al. |
| 4,564,420 A | 1/1986 | Spindeler et al. |
| 4,822,411 A | 4/1989 | Standler et al. |
| 4,889,323 A | 12/1989 | Pusch et al. |
| 6,045,602 A | 4/2000 | Shah et al. |
| 6,419,724 B1 * | 7/2002 | Monteyne ............ 75/476 |

FOREIGN PATENT DOCUMENTS

| DE | 37 13 630 A | 11/1988 |
| GB | 1593527 | 7/1981 |

OTHER PUBLICATIONS

Knop K: "Minderung Des CO2-Ausstosses Durch Einsatz Wasserstoffreicher . . . "Stahl und Eisen, vol. 122, No. 11, Nov. 14, 2002, pp. 43-51.

Diemer et al., "Potentials for Utilisation of Coke Oven Gas in Integrated Iron and Steel Works . . . ", Stahl und Eisen, vol. 124, No. 7, Jul. 15, 2004, pp. 21-30.

* cited by examiner

*Primary Examiner*—Melvyn Andrews
(74) *Attorney, Agent, or Firm*—Rothwell, Figg, Ernst & Manbeck P.C.

(57) ABSTRACT

A method and an integrated steel plant wherein, instead of using coke oven gases, converter gases and blast furnace top gases available as fuel for power generation or other heating purposes, these gases are more efficiently utilized as chemical agents for direct reduction of iron ores producing DRI.

DRI is charged to blast furnaces increasing production of crude steel without increasing the capacities of the coke oven plant and blast furnaces and without changes in the quality of the crude steel, or, if production rate is maintained, the fossil fuels specific consumption is significantly reduced.

Utilisation of primary fossil energy according to the invention also reduces the specific $CO_2$ emissions per ton of crude steel. The specific $CO_2$ emission in conventional integrated mills is about 1.6 tons of $CO_2$ per ton of crude steel.

14 Claims, 2 Drawing Sheets

METHOD AND APPARATUS FOR IMPROVED USE OF PRIMARY ENERGY SOURCES IN INTEGRATED STEEL PLANTS

FIELD OF THE INVENTION

The present invention refers to the field of integrated steel plants of the type comprising blast furnaces (BF) and blast oxygen converters (BOF) for production of crude liquid steel and coke ovens (CO) for supplying the necessary coke to the blast furnaces. More particularly, the invention refers to an improved method of utilizing the chemical values of the gases produced by BF, CO and BOF within a steel plant with advantages in energy efficiency and decreased environmental impact as measured by the amount of carbon dioxide released to the atmosphere.

BACKGROUND OF THE INVENTION

Current steel production in the world is mostly based on integrated steel plants comprising blast furnaces and basic oxygen converters. Blast furnaces require coke which is prepared by carbonization of coal in coke ovens generally located close to the blast furnaces. These three units produce a considerable amount of surplus gases which are used for power generation or heating purposes in other areas of the steel plant, for example, blast air heating stoves, boilers, soaking pits, heat treating furnaces in rolling mills, and some plants burn the non-utilized portion in flare stacks.

Increasing prices for energy, mainly for coke, and environmental restrictions, related to $CO_2$ emissions, have led to consideration of using available energies from integrated steelworks mainly for steel production instead of for power generation and other uses. Additionally, current increasing prices of scrap, DRI/HBI and other iron raw materials as well as the prevailing market fluctuations have generated a need of finding alternatives for the production of metallic iron at less cost by utilization of the chemical reducing potential of blast furnace gas (BFG), coke oven gas (COG) and blast oxygen furnace gas (BOFG).

Sometimes power generation does not fit the local electricity markets and these projects are not viable. Power generation also does not make optimum use of the chemical values of these gases. By incorporation of a direct reduction plant for reducing iron ores, the DRI produced with the COG and BOFG can be charged to the BF to decrease its consumption of coke and/or powdered coal injection (PCI), or alternatively, for increasing the production of hot metal with the same fossil fuels consumption, thus increasing the crude steel production of the integrated plant, as well as rendering the steel production facilities more environmentally fit by lowering the amount of CO2 released to the atmosphere per ton of steel. A further possibility is to increase the production of crude steel by melting the DRI with additional scrap in an electric arc furnace (EAF), without increasing the process capacity of BF and CO.

U.S. Pat. No. 4,889,323, the disclosure of which is hereby incorporated by reference for the teachings of process conditions therein, describes a mill arrangement for the production of steel wherein a direct reduction (DR) reactor is operated with a reducing gas prepared from an oxygen converter gas, off gas from the reduction reactor and coke oven gas. Coke oven gas is utilized after its fractionation by alternating pressure adsorption so as to increase its portion of hydrogen and lower its portion of hydrocarbons and also the COG is desulphurized and passed through a pressure swing adsorption (PSA) process. The reducing gas utilized in the reduction reactor is a mixture of the treated converter gas and the treated coke oven gas. DRI produced in the DR reactor is charged as coolant to the converter in substitution of steel scrap or to electric arc furnaces for the production of steel.

The process of this patent is addressed to the substitution of steel scrap charged to converters and does not teach or suggest either charging DRI to the blast furnace thus increasing the pig iron production, or the advantage of decreasing the specific amount per ton of steel of CO2 released to the atmosphere.

U.S. Pat. No. 4,822,411, the disclosure of which is hereby incorporated by reference for the teachings of process conditions therein, describes an arrangement of an integrated steel plant similar to that of the above-mentioned patent wherein a direct reduction plant is incorporated in the steel plant for the purpose of increasing the amount of steel produced without expansion of the capacities of the blast furnace and coking plant.

This patent suggests to increase the production of steel by charging the metallic iron obtained through the direct reduction reactor to the steel converters, while the amount of hot metal produced by the blast furnace remains the same. It also proposes to upgrade the reducing quality of coke oven gas by mixing it with gas from the oxygen converter and optionally with off-gas from the reduction reactor and reforming it in a catalytic reformer which is a huge piece of equipment implying high capital, operating and maintenance costs. This patent does not teach or suggest i) charging DRI to the blast furnace, thus increasing the pig iron production, ii) using the blast furnace gas for heating the reducing gas fed to the direct reduction reactor, or iii) the advantage of decreasing the specific amount per ton of steel of CO2 released to the atmosphere.

U.S. Pat. No. 4,248,624, the disclosure of which is hereby incorporated by reference for the teachings of process conditions therein, discloses a method for operating a blast furnace wherein a portion of a charge is pre-reduced iron ore with a relatively low metallization and a relatively high carbon content. This patent teaches using as a portion of the charge to a blast furnace, metallic iron as sponge iron, thus improving the productivity of the blast furnace and decreasing the specific coke rate. This patent does not suggest either the preparation of reducing gas for sponge iron production by combining coke oven gas and oxygen converter gas or the reduction of $CO_2$ emissions per ton of steel as a consequence of charging pre-reduced materials to the blast furnace.

SUMMARY OF THE INVENTION

While the general concept of increasing the steel production without increasing the capacity of the blast furnace and coke ovens has been contemplated by the prior art, the form of achieving such a production increase has been complex and requires additional process equipment. The present invention achieves the production increase in a simpler manner and also achieves a significant reduction of fossil fuels specific consumption, e.g. in the way the production is increased, the specific consumption of fossil primary energy is lowered.

The optimised utilisation of primary fossil energy according to the invention also has the effect of significantly reducing the specific $CO_2$ emissions per ton of crude steel. The specific $CO_2$ emission via the conventional BF/BOF route is about 1.6 tonnes (t) of $CO_2$/t crude steel. Utilising the process of the present invention, DRI, produced with the use of COG and BF top gas, as a metallic charge to the BF or in an EAF, allows significant reductions in absolute and/or specific $CO_2$ emissions.

It is therefore an object of the invention to provide a process and apparatus for operating an integrated steel plant wherein the capacity of steel production is increased without the need of increasing the capacity of the associated coking plant and blast furnaces.

It is another object of the invention to provide a process and apparatus for decreasing the specific consumption of fossil fuels per ton of steel produced in an integrated steel plant.

It is a further object of the present invention to provide a process and apparatus for decreasing in an integrated steel plant the amount of carbon dioxide produced per ton of steel.

Other objects of the invention will be pointed out in this specification or will be evident to those skilled in the art.

The objects of the invention are generally achieved by carrying out the method of increasing the production of steel in an integrated steel plant comprising a blast furnace for pig iron production, an oxygen converter for steel production and a coking plant for coke production, without increasing the production capacities of the blast furnace and the coking plant, by incorporating in the integrated steel plant a direct reduction reactor for producing direct reduced iron. The method comprises withdrawing and conditioning the temperature and pressure of gases effluent from the coking plant to form a first gas stream having a hydrogen content in excess of about 50% by volume and a low carbon monoxide content of less than about 10% by volume; withdrawing and conditioning the temperature and pressure of gases effluent from the basic oxygen converter to form a second gas stream having a hydrogen content less than about 10% by volume and a carbon monoxide content higher than about 50% by volume; mixing said first and second streams to form a third gas stream having a reducing potential higher than about 0.6, a hydrogen content higher than about 30% by volume and a carbon monoxide content higher than about 30% by volume; combining the third gas stream with a portion of regenerated gas effluent from the reduction reactor to form a fourth gas stream; heating said fourth gas stream to a temperature higher than about 850° C. in a gas heater; introducing iron-oxide-containing solid particles into the reduction reactor and discharging direct reduced iron particles from the reduction reactor; feeding the hot fourth gas stream to the reduction reactor to reduce iron oxides therein into metallic iron and producing the direct reduced iron; withdrawing reacted gas from the reduction reactor as a fifth gas stream; removing water and carbon dioxide from at least a portion of the fifth gas stream to regenerate its reducing potential, thereby forming a sixth gas stream; combining at least a portion of the sixth gas stream with at least a portion of the third gas stream to form the fourth gas stream; and charging the direct reduced iron to the blast furnace.

In another embodiment, the production of steel in an integrated steel plant is increased by converting coal to coke in the coke oven, and forming a first gas stream having a hydrogen content of at least about 50% by volume and a carbon monoxide content of less about 10% by volume by withdrawing and conditioning the temperature and pressure of the coke oven effluent gases. The coke, iron ore and air are charged to the blast furnace, wherein the iron ore is converted to pig iron. The pig iron and oxygen are charged to the oxygen converter wherein the pig iron is converted to steel. A second gas stream having a hydrogen content of less than about 10% by volume and a carbon monoxide content of at least about 50% by volume is formed by withdrawing and conditioning the temperature and pressure of the oxygen converter effluent gases. A third gas stream, having a reducing potential greater than about 0.6, a hydrogen content greater than about 30% by volume, and a carbon monoxide content greater than about 30% by volume, is formed by mixing the first and second gas streams. A fourth gas stream is formed by combining at least a portion of the third gas stream with at least a portion of regenerated gas effluent from the direct reduction reactor. This fourth gas stream is heated to a temperature of greater than about 850° C., and then is introduced, together with iron oxide-containing solid particles, into the direct reduction reactor wherein the solid particles are converted to metallic iron in the form of direct reduced iron. A fifth gas stream is formed by withdrawing reacted gas from the direct reduction reactor. At least a portion of the fifth gas stream is subjected to water and carbon dioxide removal, with collection of the separated carbon dioxide, to form a sixth gas stream with regenerated reducing potential. At least a portion of the sixth gas stream is used in the formation of the fourth gas stream. The direct reduced iron from the direct reduction reactor is charged to the blast furnace. One portion of the gas effluent from the direct reduction reactor can be used to heat air which is injected into the blast furnace, and another portion of the gas effluent from the direct reduction reactor can be introduced as fuel into the coke oven.

The following abbreviations are used in this specification for brevity:
BF blast furnace
BFG blast furnace gas
BOF blast oxygen furnace converter
BOFG blast oxygen furnace gas
CO coke oven
COG coke oven gas
DRI direct reduction iron
PCI powdered coal injection
EAF electric arc furnace
PSA pressure swing adsorption
tHM ton of pig iron Except as noted herein the process conditions, such as temperatures, pressures, mass flows, etc. in the various components of the integrated steel plant of the present invention are conventional and well known in the art. For instance, such conditions are disclosed in "The Making, Shaping and Treating of Steel", $10^{th}$ Edition, Association of Iron and Steel Engineers, 1985, the disclosure of which is hereby incorporated by reference.

DETAILED DESCRIPTION OF THE INVENTION

Figure 1:
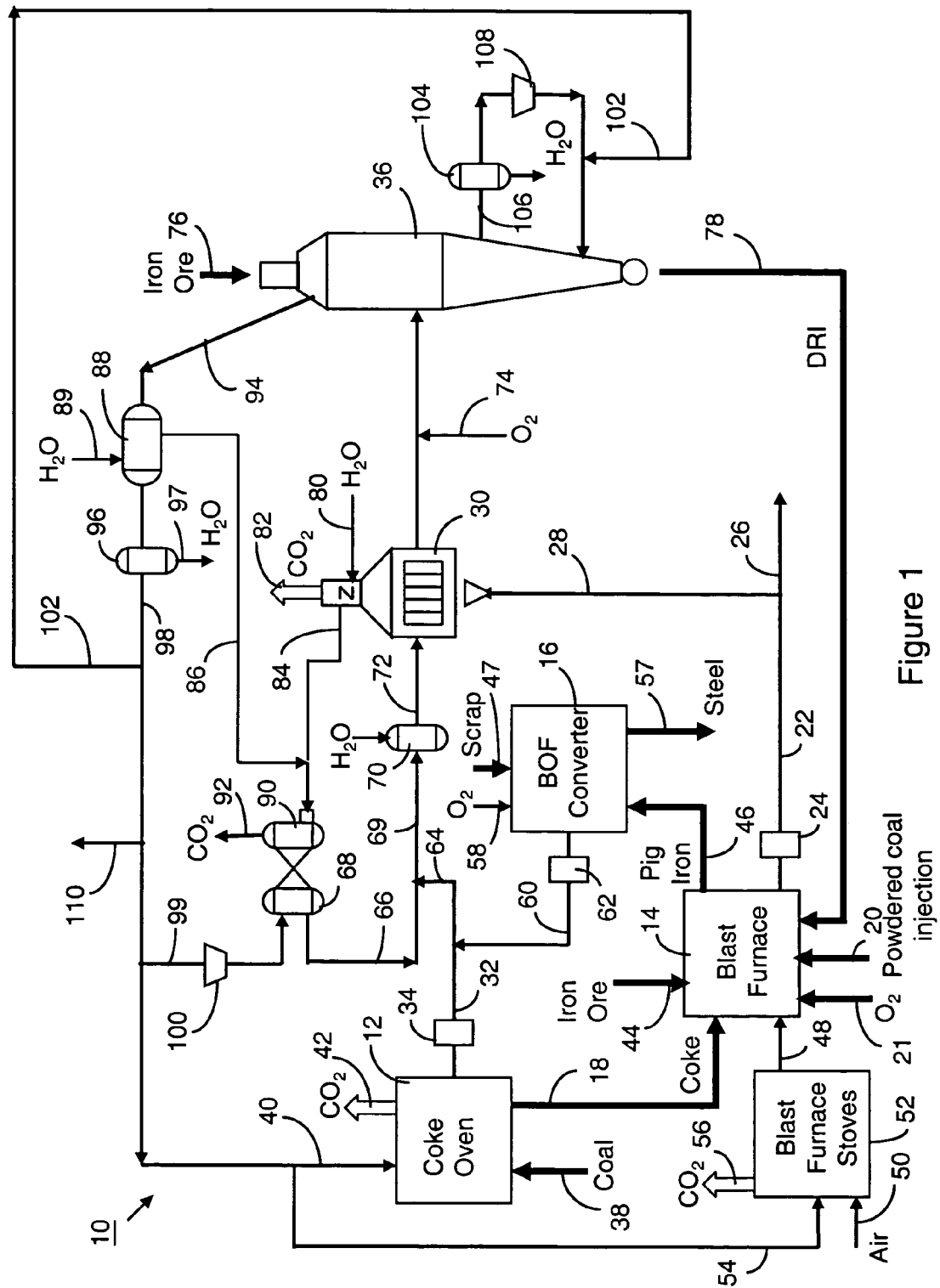
FIG. 1 is a schematic diagram of an integrated steel mill incorporating the present invention, showing the multiple exchange of materials and energy among the relevant production units within such plant.

Referring to FIG. 1, numeral 10 generally designates an integrated steel works comprising a CO 12, a BF 14 for production of pig iron and a BOF 16. An integrated steel plant normally further comprises a ladle furnace and thin slab caster or compact strip plant (CSP) for the production of hot rolled coils, but these conventional, elements are not shown in the figure for simplicity of the description in the invention.

The development of the BF process during the last 30–40 years has decreased the average coke/coal—consumption to about 470 kg/t HM. Through this development, other fuels like oil or coal have replaced coke, so that a BF nowadays can operate with about 300 kg coke/t HM identified by numeral 18 plus about 170 kg of injected powdered coal (PCI) 20 combined with oxygen 21.

BFG 22 is generated by partial combustion of carbon (coke/coal) with air. Typical compositions of BFG comprise about 4% $H_2$, about 24% CO and about 23% $CO_2$ and the rest is mostly $N_2$ which originates from the air blast injected to the BF.

For many years the use of BFG for purposes other than for the firing of stoves and boilers was not economical due to its high Nitrogen content. BFG, after collection and conditioning to temperature and pressure at conditioning station 24 has been used in the past as fuel in coke ovens, soaking pits and reheating furnaces shown only as a branching pipe 26. According to the invention a portion 28 of BFG 22 is utilized to heat the reducing gas for the direct reduction reactor in heater 30.

The composition and amount of gases in an exemplary integrated plant are shown in Table 1.

COG is a by-product of coke manufacture in coke ovens 12 which is produced during the carbonisation or destructive distillation of bituminous coal in the absence of air. As compared to BFG, COG 32 after treatment for pressure and temperature and sometimes sulphur removal at conditioning plant 34 has about 5 to 6 times higher calorific value than BFG. COG has a wider use than BFG because of its relatively low distribution costs, due to its low specific gravity and high calorific value. COG produces extremely high temperatures upon combustion and it can release heat at a high rate while not requiring excessively large combustion chambers.

TABLE 1

Mass and Energy Flows of Plants/Systems in an Integrated Steel Plant

| Item | Unit | Blast Furnace Unit/t HM | Coke Oven Plant Unit/t coke | BOF converter Unit/t LS |
|---|---|---|---|---|
| Fuel Inputs | | | | |
| Coke | GJ/t | 8.99 | | |
|  | Kg/t | 300 | | |
| PCI | GJ/t | 4.72 | | |
|  | Kg/t | 168 | | |
| Coking coal | GJ/t | | 39.91 | |
|  | t/t | | 1.22 | |
| Additional fuel/energy | GJ/t | 0.02 | 3.45 | |
|  | kWh/t | | | 25 |
| Off Gases Flows | | | | |
| Mass flow | $Nm^3$/t | 891.8 | 418.1 | 8.690 |
| Energy | GJ/t | 3.05 | 7.27 | 0.75 |
| Composition | | | | |
| $H_2$ | Vol. % | 3.9 | 62.3 | 6.5 |
| CO | Vol. % | 23.7 | 5.9 | 62.7 |
| $CO_2$ | Vol. % | 23.2 | 1.4 | 17.0 |
| $CH_4$ | Vol. % | | 49.2 | 23.9 | 13.8 |
| $C_nH_m$ | Vol. % | | 1.9 | |
| $N_2$ | Vol. % | | 4.6 | |
| $H_2S$ | g/$Nm^3$ | | 0.19 | |
| LHV | MJ/$Nm^3$ | 3.42 | 17.39 | 8.63 |

Sulphur (as $H_2S$) present in untreated (not desulphurized++) COG presents certain disadvantages in its usage, particularly when heating certain grades of alloy steel for rolling. Sulphur presence also requires the use of materials resistant to sulphur attack in pipelines, valves and burners.

For the carbonisation process the coke oven furnaces 12 require fuel for heating. In this regard, coke oven plants have a high flexibility for use of fuels from different sources, including BFG and their own generated COG. Low-calorific-value BFG is used as fuel in coke oven furnaces and hot stoves of the BF, while the high calorific coke oven gas can be used for other consumers like rolling mills and power plants. Production of hot COG is approximately 420 $Nm^3$/t of coking coal.

A typical composition of treated COG 32 is indicated in Table 1 above. However, COG without any treatment may be used in the direct reduction reactor 36 for production of DRI.

Coke oven plant 12 converts coal 38 into coke 18 by heating said coal and separating volatile components as COG 32. Off-gas 40 effluent from direct reduction reactor 36 is used as fuel in coking plant 12, producing flue gases 42 containing $CO_2$ which are emitted to the atmosphere.

Iron ore, sinter and fluxes 44 are fed to BF 14 where molten pig iron 46 is produced by reduction of iron ore and sinter by carbon monoxide and hydrogen generated from the partial combustion of coke and hot air 48. Cold air 50 is heated in stoves 52 by heat exchange with refractory materials inside stoves which store heat from combustion of fuel gases 54 effluent from the reduction reactor 36 in a manner known in the art. Combustion of fuel gases in the stoves 52 produce carbon dioxide 56 which is vented as flue gas.

Molten pig iron 46 is further processed and converted into steel 57 in a BOF 16 by adjusting carbon and other elements present in the composition of pig iron 46 and scrap 47 by blowing oxygen 58. During the blowing time, the amount of BOFG normally generated in the converter is in the range of 0.75 GJ or about 80 to 90 $Nm^3$/ton of liquid steel. BOFG 60, mainly composed of carbon monoxide and carbon dioxide, is collected, cooled and purified in conditioning plant 62. The gas conditioning plant may include a gasholder (not shown for sake of simplicity), which functions as a buffer for continuous delivery of BOFG. Currently, BOFG is flared or used in reheating furnaces. A typical composition of BOFG 60 after treatment at conditioning plant 62 is shown in Table 1.

In a conventional integrated steel mill, about 32% of the fossil primary energy (comprising coal and PCI) is transformed into surplus gas, which in most cases is currently used for power generation. The total amount of electric power which can be produced, assuming 36% efficiency, is in the range of 560 kWh/t HRC. About 220 kWh/t HRC are used for in-plant requirements and the rest, 340 kWh/t HRC, is exported outside the plant.

The hydrogen and carbon monoxide content of COG and BOFG make them suitable for the reduction of iron ores, while BFG, given its high Nitrogen content, is used as fuel for reduction gas heating and for steam/power generation.

According to the invention, COG 32, having a high content of hydrogen higher than about 50% by volume and BOFG 60 are used for reduction of iron ores in a DR reactor 36. These gas streams 32 and 60 are combined forming gas stream 64. This gas stream 64 has a composition better suited for reduction of iron ores, e.g. about 37% hydrogen and about 31% carbon monoxide by volume. The content of carbon dioxide however is about 8% and methane about 13% by volume. The proportion of these compounds is decreased by combining gas stream 64 with stream 66 effluent from the reduction reactor 36 after having been treated in $CO_2$ absorber 68. Gas stream 66 has a composition by volume of about 36% $H_2$; 24% CO; 2% $CO_2$ and 7% $CH_4$ by volume. The resulting combined gas stream 69 is saturated with water at humidifier 70 as stream 72 which is heated at gas heater 30 to a temperature above about 850° C., preferably between 900° C. and 950° C.

An oxygen containing gas 74, for example air, oxygen enriched air in various proportions or pure oxygen is injected and combined with hot gas stream 72 to further increase the temperature, providing energy for conversion of methane to $H_2$ and CO according to the self-reforming process technology wherein the reducing gas fed to the reduction reactor is efficiently produced in the reduction section of reactor 36 promoted by the catalytic action of metallic iron present in the DRI produced in said reduction zone. Partial combustion of COG with oxygen before the reactor inlet provides the additional energy, which is required for natural gas reforming in-situ, and for the carburisation of the metallic iron. Contrary to prior art proposals, with this self-reforming process an external reformer unit or an alternate reducing gas generation system are not needed.

Because of partial combustion, the reducing gas temperature at the reactor inlet is very high e.g. above about 1000° C. Due to the endothermic behaviour of the combined chemical reactions taking place inside the reactor, the resulting temperature at the reduction zone is below the potential condition for material cluster formation.

The degree of metallization and carbon content can be controlled independently by adjusting the key process parameters and the gas composition in each of the reducing and cooling gas loops of the reduction reactor.

The reactor 36 operates at elevated pressure (preferably about 6 bar absolute), allowing a high reactor productivity of about 10 t/h per $m^2$ and minimising dust losses through top gas carry-over. This is reflected in low iron ore consumption, which allows the operating costs to be kept low.

Iron ore particles 76 in form of pellets, lumps or mixtures thereof, are fed to reactor 36 through suitable conventional charging mechanisms (not shown) forming a downwardly moving bed. The bed descends by gravity through the reactor in counter-flow with the reducing gas. The rate of flow of the particles bed is regulated by suitable mechanisms known in the art, for example a rotary valve or a vibrating conveyor. DRI 78 is discharged from the reactor and charged to the blast furnace 14.

Water 80 is heated by flue gases 82 of heater 30 and converted into steam 84 which together with steam 86 produced at heat exchanger 88 is utilized at $CO_2$ stripper 90 to regenerate the absorbing solution in a manner known in the art. High purity $CO_2$ 92 removed from stripper 90 is collected and sold for further use in other industries. This selective removal of $CO_2$ 92, which is an important feature of the present invention, decreases the amount of total $CO_2$ released to the atmosphere by the integrated steel plant.

Reducing gas 94 is withdrawn from reactor 36 after having reacted with iron oxides 76 and is passed through heat exchanger 88 where some of its sensible heat is used to produce steam 86 from water 89 and thereafter it is treated for regeneration of its reducing potential by cooling and cleaning with water at cooler 96 where water 97 is condensed and separated from the gas stream 94. Hot water 97 is advantageously used for humidifying the combined recycled reducing gas 69 at humidifier 70. The main portion of de-watered gas 98 is sent as stream 99 to a compressor or pumping means 100 and passes through $CO_2$ absorber 68 thereby increasing its reducing potential and eventually is recycled to reduction reactor 36.

Another portion 102 of gas stream 98 is sent as make-up to the cooling zone of the reactor 36. This cooling gas 102 is circulated in the lower zone of reactor 36, counter-currently to the high-temperature DRI produced in its upper zone in order to bring the temperature of said DRI down to levels below about 100° C. and preferably below about 80° C., avoiding in this way any possible re-oxidation which might occur by contact of metallized DRI particles with oxygen and water of ambient air. This DRI cooling allows the DRI to be handled in open conveyors and transporters for being charged to BF 14 and also permits its open air storage. Alternately, if the economics of a hot briquetting process is low enough, DRI can be hot briquetted and the cooling gas and equipment eliminated by discharging DRI at high temperatures directly to briquetting machines (not shown). In one preferred embodiment of the invention, DRI 78 is cooled down to a temperature less than about 80° C. and moved in open conveyors to BF, storage or to other points of utilization. Cooling gas 106 is removed from reactor 36, cooled and cleaned in water-cooler 104 and recycled by means of compressor 108.

Another portion 110 of gas 98 may be vented as a purge of inert gases from the reduction system and as a means for pressure control.

For the most optimised DR process scheme, a surplus of purge gas will exist, mainly due to the need for a purge of $N_2$, which is highly concentrated in the BOFG. Excess of purge gas 54 from the reduction circuit is sent to the steelworks for use in the coke oven plant 12 and/or in a rolling mill or for power generation. The amount of recycled gas 99 through the $CO_2$ removal system influences the DRI production rate and consequently the amount of purge gas 54 and 110. Depending on the DRI demand and additional fuel needs for the different facilities in the steel works, the rate of production of DRI can be set in response to said demand and fuel needs. The proper balance will be determined by the particular characteristics and capacities of each plant.

A further aspect of the invention is that its application allows an integrated plant to improve its capability of complying with environmental restrictions related to $CO_2$ emissions, which are of economical importance due to regulations/trading aspects envisioned in the Kyoto Protocol.

The advantages of the invention can be summarized as follows: (1) Decrease of about 13% to 28% of fossil fuel consumption (coal) and decrease of about 23% to 34% of non-selective $CO_2$ emissions; (2) Potential increase of about 24% of hot metal by incorporating a DR reactor and keeping the same production rate. The cost of producing liquid steel can be decreased by about 10 US$/ton; and (3) Potential increase of about 38% of liquid steel by installing electric arc furnace facilities. In this case, the cost of crude steel can be reduced by about 22 US$/ton.

EXAMPLES

The following cases were analysed by applicants for improving overall energy consumption, $CO_2$ emissions and production costs in typical integrated steel works. A typical BF uses 300 kg of coke and 170 kg of powdered coal injection to BF (PCI) per ton of pig iron (tHM). Considering this energy input, the maximum DRI production, utilizing all available COG and BOFG, is about 350 kg/tHM, with 94% metallization and 4% carbon content. Metallization is defined as the ratio between metallic iron to total iron in DRI. Cold DRI is charged to BF.

There are two cases: (1) to keep same liquid steel production rate. The benefit in this case is a reduction of environmental impact due to a decrease of specific coal consumption and consequently of $CO_2$ emissions because the amount of PCI is lower and therefore the amount of coal burned is less; and (2) to increase pig iron production in the BF, decreasing not only specific consumption rates but $CO_2$ emissions per ton of pig iron, and consequently achieving savings in production costs.

In case (1) there is a reduction of 18% of PCI/tHM and a potential decrease of $CO_2$ emission 42, 56, 82 of about 28% less. This figure considers the selective elimination of $CO_2$ 92 from the DR plant, which should be delivered/disposed for its utilization other than venting it to the atmosphere.

In case (2) there is an increase of 24% of pig iron 46 and liquid steel 57 by charging 0.35 t of DRI/tHM in the BF. Fossil energy consumption 38, 20 decreases by about 13% as PCI/tHM and $CO_2$ in flue gases is reduced by about 23%.

Figure 2:
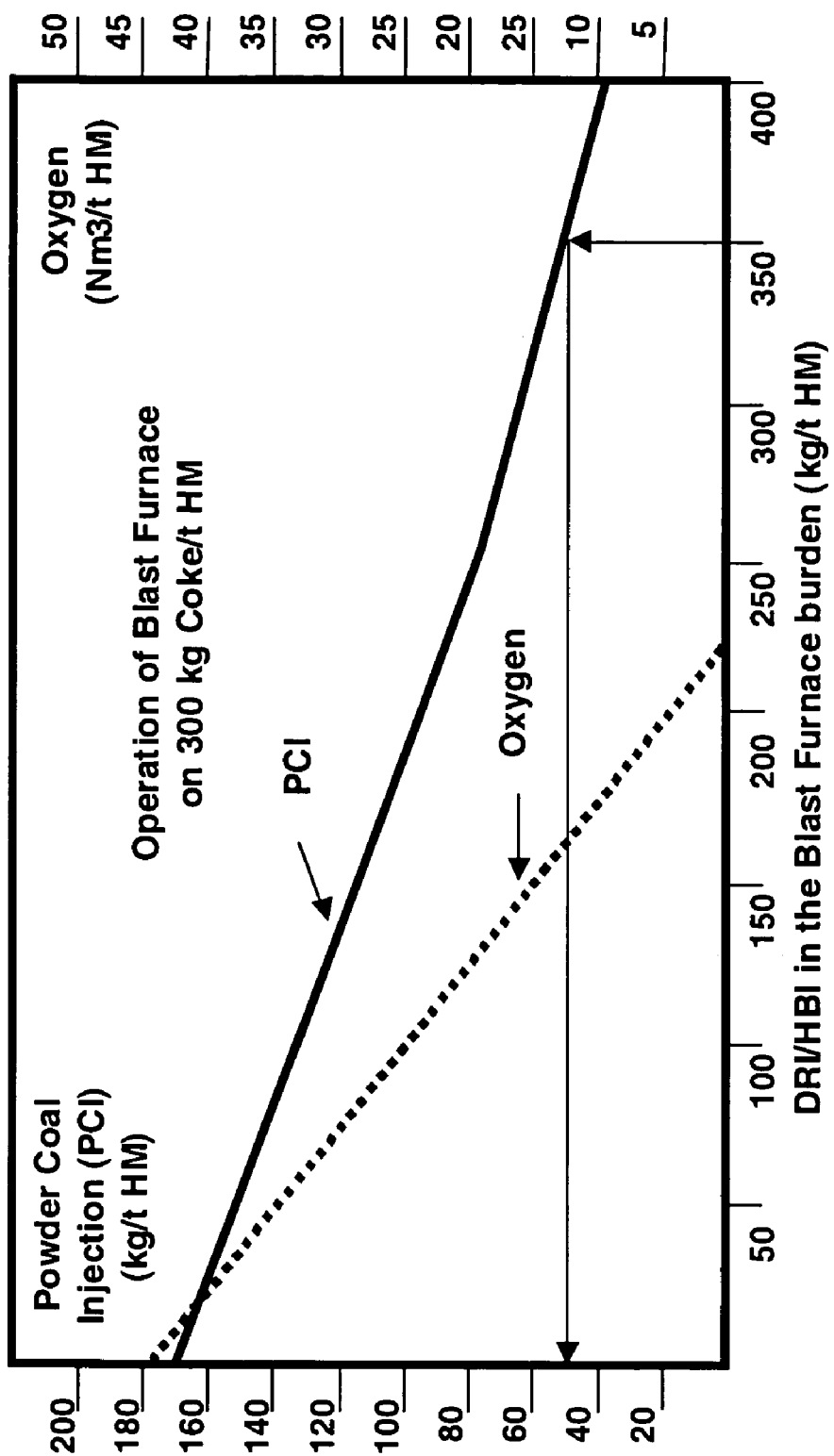
FIG. 2 is a graph showing the relationship between the amount of powdered coal injected to the blast furnace and the amount of oxygen.

FIG. 2 shows the calculated savings in powdered coal 20 and oxygen 21 injection to BF 14 as a function of the amount of DRI or HBI charged to said BF. At levels of about 250 Kg of DRI/tHM oxygen 21 is not needed and at levels of about 350 kg/tHM the amount of PCI 20 is reduced to about 50 kg/tHM from current levels of about 170 kg/tHM. This reduction in PCI contributes to a decrease of the $CO_2$ emissions because less coal is combusted per ton of liquid steel.

It is of course to be understood that the foregoing description of some preferred embodiments of the invention is intended to be illustrative only and that numerous changes can be made in the structure of the system described and its operating conditions without departing from the spirit of the invention as defined in the appended claims.

What is claimed is:

1. A method for producing steel in an integrated steel plant, the plant comprising a blast furnace for pig iron production, an oxygen converter for steel production, a coke oven for coke production and a direct reduction reactor for producing direct reduced iron, the method comprising
    forming a first gas stream having a hydrogen content of at least about 50% by volume and a carbon monoxide content of less than about 10% by volume by withdrawing and conditioning the temperature and pressure of the coke oven effluent gases;
    forming a second gas stream having a hydrogen content of less than about 10% by volume and a carbon monoxide content of at least about 50% by volume by withdrawing and conditioning the temperature and pressure of oxygen converter effluent gases;
    forming a third gas stream having a reducing potential greater than about 0.6, a hydrogen content greater than about 30% by volume, and a carbon monoxide content greater than about 30% by volume by mixing the first and second gas streams;
    forming a fourth gas stream by combining at least a portion of the third gas stream with at least a portion of regenerated gas effluent from the direct reduction reactor;
    heating the fourth gas stream to a temperature of greater than about 850° C.;
    reducing iron oxide-containing solid particles in the direct reduction reactor to metallic iron in the form of direct reduction iron by introducing the solid particles and the heated fourth gas stream into the direct reduction reactor;
    forming a fifth gas stream by withdrawing reacted gas from the direct reduction reactor;
    forming a sixth gas stream with regenerated reducing potential by removing water and carbon dioxide from at least a portion of the fifth gas stream;
    using at least a potion of the sixth gas stream in the formation of the fourth gas stream; and charging the direct reduced iron to the blast furnace.

2. Method of claim 1, wherein the fourth gas stream is heated to a temperature of 900° C. to 950° C.

3. Method of claim 2, wherein the fourth gas stream is heated by the gases effluent from the blast furnace.

4. Method of claim 1, wherein the fourth gas stream is formed by combining at last a portion of the third gas stream with at least a portion of said regenerated gas that has been cooled and cleaned with water and has had at least a portion of the $CO_2$ therein removed.

5. Method of claim 1, wherein the rate of production of direct reduced iron in the direct reduction reactor is influenced by the amount of the sixth gas stream used to form the fourth gas stream.

6. Method of claim 1, wherein the first gas stream and the second gas stream are mixed together prior to either the first or second gas stream contacting gas effluent from the direct reduction reactor.

7. Method of claim 1, including the further step of using a portion of the gas effluent from the direct reduction reactor as fuel in the coke oven.

8. Method of claim 1, further including charging air, coke and iron ore to the blast furnace, and heating the air charged to the blast furnace in an associated refractory stove.

9. Method of claim 8, wherein the air is heated using a portion of the gas effluent from the direct reduction reactor as fuel-in the refractory stove.

10. The method of claim 1, including the further step of selectively separating and collecting $CO_2$ from at least a portion of the reducing gases effluent from the direct reduction reactor.

11. Method of claim 1, including the step of injecting powdered coal into the blast furnace.

12. Method of claim 1, wherein at least a portion of the direct reduced iron discharged from the direct reduction reactor is charged to the blast furnace.

13. A method of increasing pig iron and/or liquid steel production in a blast furnace of an integrated steel plant while reducing $CO_2$ emissions per ton of pig iron, as compared to conventional integrated steel plants, which plant comprises a blast furnace for pig iron production, an oxygen converter for converting the pig iron into steel, a coke oven for the production of coke charged to the blast furnace, and a direct reduction reactor for producing direct reduced iron, said method comprising
    converting coal to coke in the coke oven;
    forming a first gas stream having a hydrogen content of at least about 50% by volume and a carbon monoxide content of less than about 10% by volume by withdrawing and conditioning the temperature and pressure of the coke oven effluent gases;
    charging iron ore, the coke and air to the blast furnace and converting the iron ore to pig iron;
    charging the pig iron and oxygen to the oxygen converter and converting the pig iron to steel;
    forming a second gas stream having a hydrogen content of less than about 10% by volume and a carbon monoxide content of at least about 50% by volume by withdrawing and conditioning the temperature and pressure of oxygen converter effluent gases;

forming a third gas stream having a reducing potential greater than about 0.6, a hydrogen content greater than about 30% by volume, and a carbon monoxide content greater than about 30% by volume by mixing the first and second gas streams;

forming a fourth gas stream by combining at least a portion of the third gas stream with at least a portion of regenerated gas effluent from the direct reduction reactor;

heating the fourth gas stream to a temperature of greater than about 850° C.;

reducing iron oxide-containing solid particles in the direct reduction reactor to metallic iron in the form of direct reduced iron by introducing the solid particles and the heated fourth gas stream into the direct reduction reactor;

forming a fifth gas stream by withdrawing reacted gas from the direct reduction reactor;

forming a sixth gas stream with regenerated reducing potential by removing water and carbon dioxide from at least a portion of the fifth gas stream and the separated carbon dioxide is collected;

using at least a potion of the sixth gas stream in the formation of the fourth gas stream;

and charging direct reduced iron from the direct reduction reactor to the blast furnace, wherein one portion of the gas effluent from the direct reduction reactor is used to heat air injected into the blast furnace, and another portion of the gas effluent from the direct reduction reactor is introduced as fuel into the coke oven.

14. Method of claim 13, wherein a portion of the gases effluent from the direct reduction reactor are subjected to $CO_2$ removal prior to combination with at least a portion of the third gas stream to form the fourth gas stream, and high purity $CO_2$ so removed is collected.

* * * * *